United States Patent
Dirne et al.

(10) Patent No.: US 6,424,489 B1
(45) Date of Patent: Jul. 23, 2002

(54) MAGNETIC HEAD HAVING A WEAR-RESISTANT LAYER, AND METHOD OF MANUFACTURING SUCH A MAGNETIC HEAD

(75) Inventors: Franciscus W. A. Dirne; Victor Zieren, both of Eindhoven; Arnold Broese Van Groenou, Waalre; Leo-Franciscus M. Van Oorschot, Eindhoven; Peter Lasinski, Eindhoven; Mathijs De Jongh, Eindhoven; Freddy Roozeboom, Eindhoven, all of (NL)

(73) Assignee: U.S. Philips Corporation, New York, NY (US)

( * ) Notice: Subject to any disclaimer, the term of this patent is extended or adjusted under 35 U.S.C. 154(b) by 1536 days.

(21) Appl. No.: 08/690,525

(22) Filed: Jul. 31, 1996

Related U.S. Application Data

(63) Continuation of application No. 08/346,321, filed on Nov. 29, 1994, now abandoned, which is a continuation of application No. 08/101,519, filed on Aug. 2, 1993, now abandoned.

(30) Foreign Application Priority Data

Aug. 3, 1992 (EP) ............................................. 92202392
Jan. 22, 1993 (EP) ............................................. 93200157

(51) Int. Cl.$^7$ ............................................. G11B 5/187
(52) U.S. Cl. ............................................. 360/122
(58) Field of Search .............................. 360/122, 121, 360/125, 126

(56) References Cited

U.S. PATENT DOCUMENTS 3,665,436 A * 5/1972 Murray et al. ............... 360/122
4,052,748 A   10/1977 Kuijk ........................... 360/113

FOREIGN PATENT DOCUMENTS

| DE | 3010348 | * | 9/1981 | ................. 360/128 |
| EP | 0123826 |   | 7/1984 | |
| JP | 5573917 |   | 4/1980 | |
| JP | 70926   | * | 5/1980 | ................. 360/122 |
| JP | 19517   | * | 2/1981 | ................. 360/122 |
| JP | 6159820 | * | 12/1981 | ................. 360/122 |
| JP | 6337811 |   | 2/1988 | |
| JP | 58613   | * | 3/1988 | ................. 360/122 |
| JP | 282711  | * | 11/1989 | ................. 360/122 |
| SU | 622151  | * | 8/1978 | ................. 360/122 |
| WO | 9000793 |   | 1/1990 | |

OTHER PUBLICATIONS

IBM Technical Disclosure Bulletin (vol. 7, No. 4, Sep. 1964, p. 333).*
IBM Technical Disclosure Bulletin (vol. 11 No. 10 Mar. 1969, p. 1199).*
IBM Technical Disclosure Bulletin (vol. 13 No. 9 Feb. 1971, p. 2759).*
IBM Technical Disclosure Bulletin, vol. 11, No. 10, Mar. 1969, p. 1199.

* cited by examiner

Primary Examiner—Allen Cao

(57) ABSTRACT

Magnetic head having a head face (5) and comprising a head structure composed of thin layers and provided with a transducing element (E11), in which different materials occurring in different areas are present in the head face. The head face is provided with a first layer (31) of a material which is more sensitive to corrosion than other materials in the head face, and the first layer is provided with a second layer (33) of a wear-resistant material which is more insensitive to corrosion than the material of the first layer. The second layer constitutes a contact face (35) for cooperation with a magnetic tape (7).

7 Claims, 2 Drawing Sheets

MAGNETIC HEAD HAVING A WEAR-RESISTANT LAYER, AND METHOD OF MANUFACTURING SUCH A MAGNETIC HEAD

This is a continuation of application Ser. No. 08/346,321, filed Nov. 29, 1994, now abandoned which is a continuation of application Ser. No. 08/101,519, filed Aug. 2, 1993, now abandoned.

BACKGROUND OF THE INVENTION

The invention relates to a magnetic head having a head face and comprising a head structure composed of thin layers and provided with a transducing element, in which different materials in different areas are present in the head face.

A magnetic head of this type is known from JP-A 63-37811 (herewith incorporated by reference). The known magnetic head has a thin-film structure provided on a substrate and comprises a magnetic yoke with a magnetoresistive element and a transducing gap. The magnetic head also has a head face in which the transducing gap and magnetic flux guides for guiding magnetic information towards the magnetoresistive element terminate. The head face of the known magnetic head is used for guiding a magnetic record carrier, particularly a magnetic tape.

In magnetic heads which have a layer structure, soft materials, notably soft-magnetic materials of flux guides, for example permalloy, occur in addition to relatively hard materials, notably substrate materials, for example $Al_2O_3$/TiC. Due to the abrasive effect of the record carrier moving along the head face during operation, the relatively soft materials may wear on the head face, which results in a hollowing of the layer structure of the head face. Such a hollowing leads to a larger distance between the record carrier and the layer structure and hence to a reduced transfer of information from the record carrier to the magnetic head. Consequently, a long lifetime cannot be guaranteed for the known magnetic head whose head face also serves as a tape contact face.

It is known per se to provide wear-resistant layers on the head faces of magnetic heads in order to inhibit wear. It is known from IBM Technical Disclosure Bulletin, vol. 11, no. 10, March 1969, pp. 1199 (herewith incorporated by reference) to provide $Cr_2O_3$ by means of flame plating on heat-resistance magnetic heads for forming wear-resistant layers. JP-A 66-73917 (herewith incorporated by reference) proposes to provide core limbs of permalloy comprising Cr with a layer of Cr oxide having a thickness of more than 0.5 $\mu$m and to form a layer of Cr oxide by means of sputtering on core limbs of permalloy not comprising Cr. EP-A 0 123 826 (herewith incorporated by reference) proposes to provide the head face of a magnetic head with a sputtered layer of titanium carbide, chromium carbide or titanium nitride which is thinner than 0.2 $\mu$m. However, magnetic heads whose head faces have a wear-resistant layer have the problem that the transfer of information from the record carrier to the magnetic head is worse than in corresponding magnetic heads without a wear-resistant layer on the head face. In order that more favourable output signals are still achieved during operation, it is required that the wear-resistant layer should not be made thicker than is strictly necessary due to the wear-inhibiting function. Thin wear-resistant layers, notably thinner than 100 nm, are generally not gas and moist-proof so that corrosively reacting substances, notably from the record carrier, can reach the head face via pores in the wear-resistant layer. Notably soft-magnetic materials such as NiFe alloys are readily affected by corrosively reacting substances, resulting in a decrease of the transfer of information from the magnetic tape to the transducing element. It has been found that many magnetic tapes contain, inter alia chlorine, and that during scanning of these magnetic tapes Cl ions diffuse from the magnetic tapes into the head faces of the magnetic heads where they cause local corrosion.

OBJECTS AND SUMMARY OF THE INVENTION

It is an object of the invention to improve the magnetic head described in the opening paragraph in such a way that it has a wear-resistant and corrosion-resistant head face.

The magnetic head according to the invention is characterized in that the head face is provided with a first layer of a material which is more sensitive to corrosion than said materials in the head face, and the first layer is provided with a second layer of a wear-resistant material which is more insensitive to corrosion than the material of the first layer.

The second layer, which constitutes a contact face for cooperation with a record carrier, protects the magnetic head according to the invention from abrasive and corrosive wear, while the first layer present between the head face and the second layer protects the magnetic head from corrosively reacting substances such as chlorine originating from the record carrier. It has also been found that the adhesion of wear-resistant materials to materials occurring in the head face can be improved by suitable choice of the material of the first layer; in other words, the first layer may also serve as an adhesive layer.

To ensure a favourable signal transmission from the record carrier to the transducing element and/or from the transducing element to the record carrier, said layers should have a minimal thickness. Favourable results were achieved with magnetic heads according to the invention, whose first layer had a thickness of between 1 nm and 20 nm and whose second layer had a thickness of between 10 nm and 100 nm. However, a magnetic head is preferred whose first layer has a thickness of less than 5 nm and whose second layer has a thickness of less than 60 nm, because only very limited output losses occur in such cases.

An embodiment of the magnetic head according to the invention is characterized in that the material of the first layer mainly comprises a metal from the group of Ti, Zr, Hf, V, Nb, Ta, Cr, Al, Zn. All the metals of this group are non-magnetic metals having lower standard reduction potential, $-E°$ values in accordance with the U.S. definition, than Fe; thus, they are less noble than Fe as well as Fe alloys, for example an NiFe alloy—permalloy—. Thus, soft-magnetic flux guides of permalloy terminating in the head face are protected from corrosion by the material of the first layer. The metals may be provided on the head face by means of known deposition methods, particularly physical or chemical vapour deposition such as sputtering or CVD.

An embodiment of the magnetic head according to the invention is characterized in that the material of the second layer is one of the materials from the group of chromium oxide, chromium nitride, hafnium nitride, titanium nitride, chromium carbide, titanium carbide, tungsten carbide, diamond. All these materials have good wear-resistant properties and adhere satisfactorily to the metals of the first layer. The materials may be provided on the first layer by known techniques such as sputtering deposition, vapour deposition or CVD. For process reasons the following combinations of materials for the first and second layers are preferred: titanium and titanium nitride or titanium carbide; hafnium and hafnium nitride; chromium and chromium oxide or chromium nitride or chromium carbide.

An embodiment of the magnetic head according to the invention is characterized in that the chromium oxide is mainly $Cr_2O_3$, the material of the first layer being Cr. This magnetic head according to the invention has a wear-resistant contact face formed by the layer mainly comprising $Cr_2O_3$ for cooperation with a record carrier, particularly a magnetic tape. At a layer thickness of 10 nm to 100 nm a favourable signal transmission between the record carrier and the transducing element is ensured. It has also been found that the contact face has a good wear resistance, not only in the temperature range between 5° C. and 85° C., but also at temperatures in the range between 5° C. and −20° C. This is particularly important for magnetic heads which are used in portable apparatuses and in magnetic scanning devices intended for outdoor use, such as car radio cassette recorders.

It has been found by experiment that a layer of eminent quality mainly comprising $Cr_2O_3$ on the head face can be obtained by sputtering. Already at layer thicknesses of less than 60 nm, high wear resistances are found to be achievable by means of sputtering. A further advantage of the sputtered wear-resistant layer mainly comprising $Cr_2O_3$ is that it can be formed at temperatures of less than 300° C. The magnetic properties of magnetic materials present in the layered head structure will then remain unaffected during formation of this layer. A wear-resistant layer mainly comprising $Cr_2O_3$ and provided on the head face by means of sputtering yields a magnetic head according to the invention which supplies favourable output signals during operation and is suitable for use at relatively low temperatures and, moreover, has a long lifetime.

It has been found by experiment that a layer having a thickness of approximately 5 nm mainly comprising Cr and preferably provided by means of sputtering is sufficient to inhibit corrosion of the head face and to ensure a satisfactory adhesion of the layer mainly comprising $Cr_2O_3$ to the head face.

The invention also relates to a method of manufacturing a magnetic head according to the invention, whose first layer mainly comprises Cr and whose second layer mainly comprises $Cr_2O_3$. In this connection the invention has for its object to provide a method which is as simple as possible for manufacturing such a wear-resistant magnetic head.

The method according to the invention is characterized in that a first layer mainly comprising Cr is formed on the head face, at least on the head structure by sputter deposition, and a second layer mainly comprising $Cr_2O_3$ is formed on the first layer also by sputter deposition.

An embodiment of the method according to the invention is characterized in that sputtering is performed with a chromium target without oxygen addition until the first layer is formed, whereafter oxygen is supplied for forming the second layer. It has been found that the oxygen can be supplied after the formed layer mainly comprising Cr has a thickness of several nanometres. It has also been found that, provided it is not extremely low, the oxygen pressure has no substantial influence on the composition of the formed wear-resistant layer mainly comprising $Cr_2O_3$, which renders the properties of this wear-resistant layer independent of small process variations. Due to the reliability of the method, sputtering in the presence of oxygen need only to take place until the formed layer mainly comprising $Cr_2O_3$ has a thickness of approximately 60 nm.

BRIEF DESCRIPTION OF THE DRAWINGS

These and other aspects of the invention will be apparent from and elucidated with reference to the embodiments described hereinafter in conjunction with the drawings, in which.

DESCRIPTION OF THE PREFERRED EMBODIMENT

Figure 1:
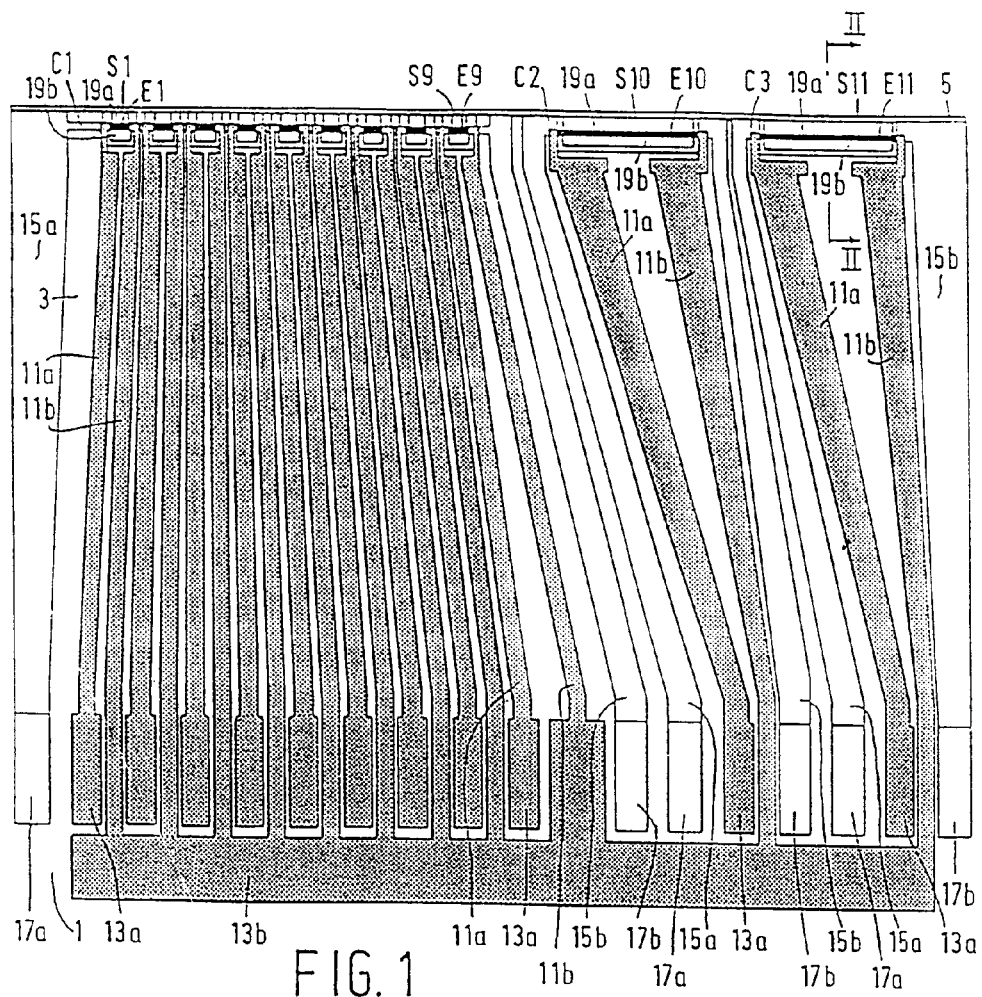
FIG. 1 is a layout of an embodiment of the magnetic head according to the invention.
Figure 2:
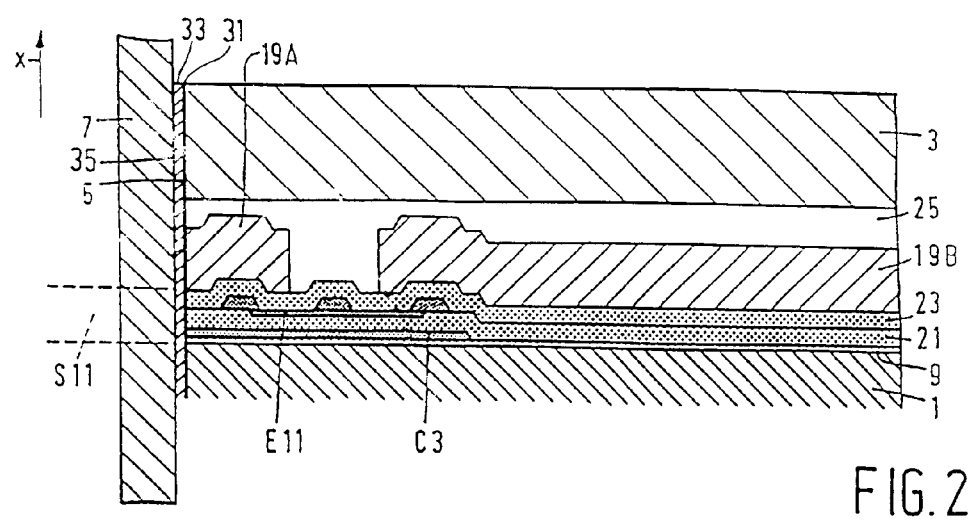
FIG. 2 is a diagrammatic cross-section taken on the line II—II through a transducing gap of the magnetic head of FIG. 1.
Figure 3:
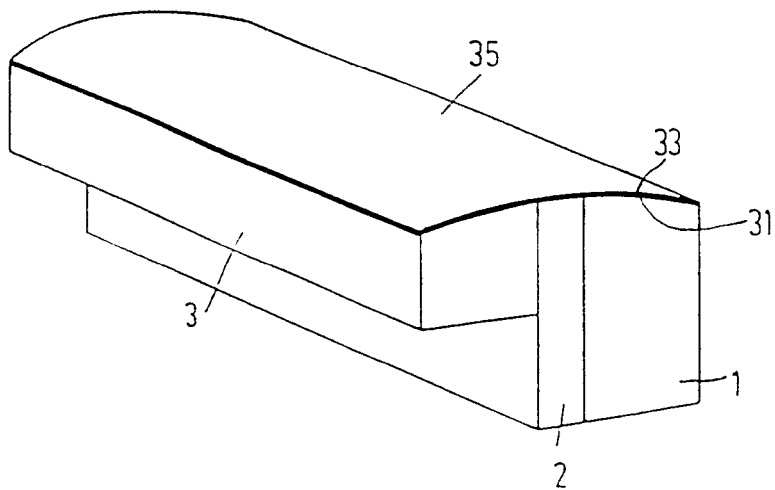
FIG. 3 is a perspective elevational view of the magnetic head of FIG. 1.

The thin-film magnetic head according to the invention shown in FIGS. 1, 2 and 3 comprises a support or substrate 1, in this example of a magnetic material, viz. NiZn ferrite on which a head structure 2 composed of magnetic layers, electric layers and insulating layers is provided. The head structure 2 composed by means of thin-film techniques is protected by a counterblock 3 of a non-magnetic material, for example $Al_2O_3$/TiC. The magnetic head has a head face 5 with eleven transducing gaps in this example. A group of nine gaps S1 to S9 of the eleven transducing gaps is intended for reading information in a digital form and one pair of gaps S10 and S11 is intended for reading information in an analog form on a record carrier 7 which moves along the magnetic head in a direction x. The gaps S1 to S9 for digital use generally have a smaller gap length than the gaps S10 and S11 for analog use. Moreover, the gap length may be chosen to be such that both analog and digital information can be read by one and the same gap.

The magnetic head according to the invention comprises an insulation layer 9 provided on the substrate 1, which insulation layer is provided with three electric conductors C1, C2 and C3 in this example, which conductors may extend into the transducing gaps. The magnetic head also comprises eleven magnetoresistive elements E1 to E11, further referred to as MR elements which comprise, for example a layer of NiFe on which one or more equipotential strips, for example of Au may be provided. The MR elements E1 to E11 are each provided with a pair of first connection tracks 11a and 11b which terminate in first connection faces 13a and 13b, respectively. Both the first connection tracks and the first connection faces are preferably made of Au. It is to be noted that an MR element provided with equipotential strips is known per se and is described inter alia in U.S. Pat. No. 4,052,748 (herewith incorporated by reference).

Said electric conductors C1, C2 and C3 are used for biasing the MR elements E1 to E9, E10 and E11 and are each provided with a pair of second connection tracks 15a and 15b which terminate in second connection faces 17a and 17b, respectively.

The magnetic head also comprises eleven pairs of flux guides of a soft-magnetic material, for example permalloy, each pair comprising a first or front flux guide 19a and, spaced apart therefrom, a second or rear flux guide 19b. The front flux guide 19a extends as far as the head face 5 for cooperation with the magnetic record carrier 7. The MR elements E1 to E11 are present between the substrate 1 and the flux guides, each MR element constituting a bridge between a first and a second flux guide 19a and 19b. In certain constructions and for certain uses it is possible to omit the rear flux guides. It is also possible to start from a non-magnetic substrate and to provide an extra flux guide.

The electric conductors, the MR elements and the flux guides are electrically insulated from each other by a plurality of insulation layers of an electrically and magnetically insulating material, for example an oxide or a polymer. The insulation layers are denoted by the reference numerals 21 and 23 in FIG. 2. A further insulation layer 25 in the form of, for example an adhesive layer is present between the shared flux guides 19a and 19b and the counterblock 3.

A first layer 31 mainly comprising Cr is provided on the head face 5 of the magnetic head according to the invention, while a second layer 33 mainly comprising $Cr_2O_3$ is provided on the first layer for forming a wear-resistant contact face 35 for cooperation with the tape-shaped record carrier 7. On the one hand, the first layer 31 ensures a satisfactory adhesion of the second layer to the magnetic head and on the other hand protects the materials of the head structure, particularly the soft-magnetic materials from attack by exterior aggressive substances.

Figure 4:
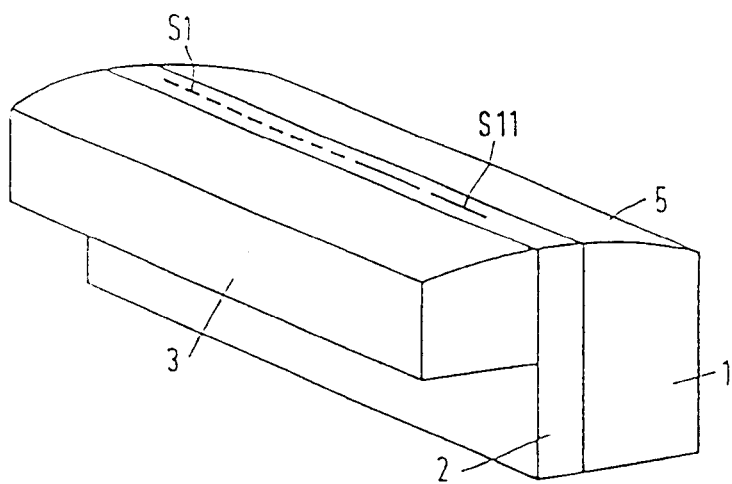
FIG. 4 is a perspective elevational view of the magnetic head of FIG. 1 in a production stage in which the magnetic head still has an uncoated head face.

The method of providing the layers 31 and 33 on the head face will now be described with reference to FIG. 4. After the assembly of substrate 1, head structure 2 and counterblock 3 has been provided with the contact face 5, for example by grinding and/or polishing, the assembly is placed in a known sputtering device comprising a chromium target. By reactive RF sputtering, for example RF diode sputtering at 10 mTorr Ar, mainly Cr is deposited on the head face 5 at the transducing gaps S1–S11 and at both sides thereof.

After a given layer thickness, for example 5 nm has been formed by deposition of Cr, oxygen is supplied to the sputtering device, whereby the layer mainly comprising $Cr_2O_3$ is formed at, for example 1 mTorr. An advantage of this method is that the two layers can be provided right after each other, using the same sputtering device.

It is to be noted that the invention is not limited to the embodiment shown. For example, the magnetic head according to the invention may comprise one or more inductive transducing elements instead of or in addition to magnetoresistive transducing elements for recording information on a record carrier. Moreover, instead of a wear-resistant layer of $Cr_2O_3$, a layer of a different material from the group of chromium oxide, chromium nitride, hafnium nitride, titanium nitride, chromium carbide, titanium carbide, tungsten carbide and diamond may be used as a wear-resistant layer. Instead of Cr, a metal from the group of Ti, Zr, Hf, V, Nb, Ta, Al and Zn may be used for forming the first layer extending between the head face and the wear-resistant layer.

What is claimed is:

1. A magnetic head having a head face and comprising a head structure provided with a transducing gap, said transducing gap terminating in said head face, different materials being present in different areas of the head face, characterized in that the head face is provided at the transducing gap and at both sides thereof with a first layer of a material which is more sensitive to corrosion than said materials of the head face, and the first layer is provided, at the transducing gap and at both sides thereof, with a second layer of a wear-resistant material that is more insensitive to corrosion than the material of the first layer.

2. A magnetic head as claimed in claim 1, characterized in that the first layer has a thickness of between 1 nm and 20 nm and the second layer has a thickness of between 10 nm and 100 nm.

3. A magnetic head as claimed in claim 1, characterized in that the material of the first layer mainly comprises a metal selected from the group consisting of Ti, Zr, Hf, V, Nb, Ta, Cr, Al, and Zn.

4. A magnetic head as claimed in claim 1, characterized in that the material of the second layer is one of the materials selected from the group consisting of chromium oxide, chromium nitride, hafnium nitride, titanium nitride, chromium carbide, titanium carbide, and tungsten carbide, diamond.

5. A magnetic head as claimed in claim 2, characterized in that the material of the first layer mainly comprises a metal selected from the group consisting of Ti, Zr, Hf, V, Nb, Ta, Cr, Al, and Zn.

6. A magnetic head as claimed in claim 2, characterized in that the material of the second layer is one of the materials selected from the group consisting of chromium oxide, chromium nitride, hafnium nitride, titanium nitride, chromium carbide, titanium carbide, tungsten carbide and diamond.

7. A magnetic head as claimed in claim 3, characterized in that the material of the second layer is one of the materials selected from the group consisting of chromium oxide, chromium nitride, hafnium nitride, titanium nitride, chromium carbide, titanium carbide, tungsten carbide and diamond.

* * * * *